US00RE42067E

(19) United States
(12) Reissued Patent
Lei et al.

(10) Patent Number: US RE42,067 E
(45) Date of Reissued Patent: Jan. 25, 2011

(54) METHOD FOR CONTROLLING OPTICAL PICKUP HEAD UPON SWITCHING FROM FOLLOWING MODE TO SEEKING MODE

(75) Inventors: Keng-Lon Lei, Shindian (TW); Ronnie Lai, Shindian (TW)

(73) Assignee: Tian Holdings, LLC, Wilmington, DE (US)

(21) Appl. No.: 12/357,606

(22) Filed: Jan. 22, 2009

(Under 37 CFR 1.47)

Related U.S. Patent Documents

Reissue of:
(64) Patent No.: 7,167,421
Issued: Jan. 23, 2007
Appl. No.: 10/411,788
Filed: Apr. 11, 2003

(30) Foreign Application Priority Data

May 23, 2002 (TW) ..... 91110945

(51) Int. Cl.
*G11B 7/085* (2006.01)
*G11B 7/00* (2006.01)

(52) U.S. Cl. ..... 369/30.17; 369/44.29

(58) Field of Classification Search ..... 360/78.04, 360/78.06; 369/30.1–30.12, 30.15–30.17, 369/44.27–44.31, 44.35–44.36, 47.38–47.4, 369/47.45, 47.55, 53.3
See application file for complete search history.

(56) References Cited

U.S. PATENT DOCUMENTS 5,164,931 A * 11/1992 Yamaguchi et al. ..... 369/30.17
5,383,068 A * 1/1995 Shimizu et al. ..... 360/78.06
5,457,671 A * 10/1995 Takata et al. ..... 369/44.28
5,604,722 A * 2/1997 Suzuki ..... 369/44.28
5,661,705 A * 8/1997 Kunikata et al. ..... 369/44.28
5,805,540 A * 9/1998 Kitai et al. ..... 369/44.28
6,088,186 A * 7/2000 Carlson ..... 360/77.04
6,335,845 B1 * 1/2002 Yamaguchi et al. ..... 360/78.04
6,339,566 B1 * 1/2002 Kishimoto et al. ..... 369/44.28
6,606,283 B2 * 8/2003 Chan ..... 369/30.17
6,925,037 B2 * 8/2005 Kishimoto et al. ..... 369/44.29

FOREIGN PATENT DOCUMENTS

JP 06325519 A * 11/1994
JP 11120722 A * 4/1999

OTHER PUBLICATIONS

English abstract of JP 06325519 A.*
English abstract of JP 11120722 A.*
Jackson, Leland B. "Section 6.7: Structure for Discrete–Time Filters." Signals, Systems, and Transforms. pp. 343–347. Reading, MA: Addison–Wesley Publishing Company. Apr. 1991.*

* cited by examiner

*Primary Examiner*—Wayne R Young
*Assistant Examiner*—Nathan A Danielsen
(74) *Attorney, Agent, or Firm*—Perkins Coie LLP

(57) ABSTRACT

A method for controlling an optical pickup head of an optical processing apparatus is provided. A first lead-lag compensator is disabled and a second lead-lag compensator is enabled when the optical pickup head switches from a following mode to a seeking mode. Then, an initial operating factor of the second lead-lag compensator is determined according to a last input value and a last output value of the first lead-lag compensator. An initial kick force of the actuator in the seeking mode is calculated by realizing the last input value and the last output value of the first lead-lag compensator immediately before the first lead-lag compensator is disabled. Finally, the optical pickup head is actuated to perform a seeking operation with the initial kick force.

24 Claims, 4 Drawing Sheets

METHOD FOR CONTROLLING OPTICAL PICKUP HEAD UPON SWITCHING FROM FOLLOWING MODE TO SEEKING MODE

Matter enclosed in heavy brackets [ ] appears in the original patent but forms no part of this reissue specification; matter printed in italics indicates the additions made by reissue.

*CROSS-REFERENCES TO RELATED APPLICATIONS*

*This patent application is a reissue application for commonly assigned U.S. Pat. No. 7,167,421, issued Jan. 23, 2007, from U.S. patent application Ser. No. 10/411,788, filed Apr. 11, 2003, which claims priority to Taiwan Application Serial Number 91110945, filed May 23, 2002, issued as Taiwan Patent No. 223796 on Nov. 11, 2004, the disclosures of which is hereby incorporated by reference herein in its entirety.*

FIELD OF THE INVENTION

The present invention relates to a method for controlling an optical pickup head, and more particularly to a method for controlling an optical pickup head upon switching from a following mode to a seeking mode. The present invention also relates to a method for determining an initial kick force of an actuator during the optical pickup head is switched from a following mode to a seeking mode.

BACKGROUND OF THE INVENTION

Optical disks such as compact disks (CDs), video compact disks (VCDs) and digital versatile disk (DVDs) are able to be played by recording and reproducing apparatuses. When an optical pickup head of an optical disk drive operates, the light emitted by a light source such as a laser diode is focused by an object lens of the optical pickup head on an optical disk, and the light reflected by the optical disk is transmitted to a light sensor to realize information from the disk.

Referring to FIG. 1, the optical pickup head 10 moves along two main directions, i.e. a direction perpendicular to the disc face, referred as a focusing direction F, and a direction parallel to the disc face, referred as a following direction T.

During operation, a focusing error and a tracking error usually arise on the rotating disk. The focusing error is generally caused by vibration of the disk in the focusing direction F, and the tracking error is caused by eccentricity of the disk in the following direction T. To correct these errors, a tracking control system for an optical pickup head was developed, as can be seen in FIG. 2. The optical pickup head 20 has six light receiving parts A, B, C, D, E and F for producing output signals, when receiving light reflected from the optical disk. The output signals of E and F parts are amplified through a pre-amplifier 21 to produce a tracking error signal TE. The tracking error signal TE is processed by a lead-lag compensating apparatus 23 included in a digital signal processor (DSP). In the lead-lag compensating apparatus 23, either a first lead-lag compensator 231 or a second lead-lag compensator 232 is selectively used to generate a tracking output signal TRO. The tracking output signal TRO is transmitted to an actuator 24 to provide a moving force for actuating a trace shift of the optical pickup head 20 in the following direction accordingly.

The first lead-lag compensator 231 comprises a first lead compensator 2311 and a first lag compensator 2312, and the second lead-lag compensator 232 comprises a second lead compensator 2321 and a second lag compensator 2322. The first lead-lag compensator 231 and the second lead-lag compensator 232 have respective gains for complying with various operational statuses. For example, the first lead-lag compensator 231 with a relatively low gain is selected when the optical pickup head 20 is in a following mode. In contrast, the second lead-lag compensator 232 with a relative high gain is selected when the optical pickup head 20 is in a seeking mode. The term "following mode" used herein means that the position of the optical pickup head with respect to the tracks is maintained in the proper center position above the selected track. The term "seeking mode" means that the optical pickup head jumps from one track to another.

In particular, when the optical pickup head 20 is switched from a following mode to a seeking mode, the work for compensation is shifted from the first lead-lag compensator 231 to the second lead-lag compensator 232. Meanwhile, the second lead-lag compensator 232 is operated under preset initial values to provide an initial kick force of the actuator 24 to move the optical pickup head for seeking operation. During the seeking mode, a velocity error signal Verr is produced by a velocity profile generator 25 according to a frequency variation level of the tracking error signal TF, which is indicative of the velocity of the optical pickup head relative to the velocity of the disk. The velocity error signal Verr is then sent into the second lead-lag compensator 232 to adjust the kick force for controlling movement of the actuator 24.

FIG. 3(a) schematically illustrates some positions of the optical pickup head 20 occurring relative to the track 1 of an optical disk in a following mode. Due to the influence of inherent eccentric feature of the optical disk, which is particularly significant under high revolving speed, the optical pickup head 20 may swing inwardly or outwardly like a sine wave relative to the track such that the positions thereof are slightly deviated from the ideal trajectory. Therefore, the tracking error signal TE and the tracking output signal TRO also swing in similar sine-wave manners, as can be seen in FIGS. 3(b) and 3(c), respectively. That is to say, the optical pickup head 20 has different momentum at different positions upon switching from the following mode to the seeking mode. For example, the optical pickup head 20 swinging to position 2 tends to move toward the track 2. In contrast, the optical pickup head 20 swinging to position 4 tends to move toward the track 0. Therefore, at the moment the following mode is switched to the seeking mode, the energy required for moving the optical pickup head from different positions around a starting track to the target track will be different. This effect is particularly significant when the seeking operation is a short seeking one. Since the initial value provided for the second lead-lag compensator 232 is constant in the prior art at the moment the optical pickup head is switched from the following mode to the seeking mode, the above-mentioned effect resulting from varied positions of the optical pickup head around the starting track is not considered by the prior art compensator 232. Therefore, when the optical pickup head 20 jumps only a few tracks, for example less than ten tracks, seeking failure may occur due to the improper initial kick force, which results in inferior data pickup performance.

SUMMARY OF THE INVENTION

It is an object of the present invention to provide a method for controlling an optical pickup head upon switching from a following mode to a seeking mode so as to properly determine an initial kick force of the actuator.

It is another object of the present invention to provide a method for determining an initial kick force of an actuator during the optical pickup head is switched from a following mode to a seeking mode.

In accordance with an aspect of the present invention, there is provided a method for controlling an optical pickup head of an optical processing apparatus. The optical pickup head is actuated by an actuator of the optical processing apparatus in either a following mode or a seeking mode. A first compensator of the optical processing apparatus with a first gain is disabled, and a second compensator of the optical processing apparatus with a second gain higher than the first gain is enabled when the optical pickup head switches from the following mode to the seeking mode. Then, an initial operating factor of the second compensator is determined according to a last input value and a last output value of the first compensator, which are realized immediately before the first compensator is disabled in order to calculate an initial kick force of the actuator in the seeking mode. Finally, the optical pickup head is actuated to perform a seeking operation with the initial kick force.

Generally, the initial kick force is used for actuating the optical pickup head before a velocity feedback control of the optical pickup head is entered. Afterwards, the initial operating factor of the second compensator is replaced by an updated operating value realized in response to a velocity error signal to adjust a kick force of the actuator under the velocity feedback control of the optical pickup head.

In an embodiment, the first compensator and the second compensator are lead-lag compensators. The initial operating factors of the second lead-lag compensator is an output value a(nseek) of the lag compensator of the second lead-lag compensator, wherein $$a(nseek)=k1\times b(nseek)+k2\times X(ntrack)+k3\times Y(ntrack)$$

where b(nseek) is an input value of the lag compensator of the second lead-lag compensator, X(ntrack) and Y(ntrack) are the last input and the last output values of a lag compensator of the first lead-lag compensator, respectively, and k1, k2 and k3 are coefficients.

For example, the optical processing apparatus includes an optical pickup apparatus selected from one of a compact disk-read only memory (CD-ROM) drive and a digital versatile disk-read only memory (DVD-ROM) drive. And, the optical processing apparatus includes an optical recording apparatus selected from a group consisting of a compact disk-recordable (CD-R) drive, a compact disk-rewritable (CD-RW) drive, a digital versatile disk-recordable (DVD-R) drive, a digital versatile disk-rewritable (DVD-RW) drive and a digital versatile disk-random access memory (DVD-RAM) drive.

According to another aspect of the present invention, there is provided a method for controlling an optical pickup head of an optical processing apparatus upon switching from a following mode to a seeking mode. The optical processing apparatus further comprises a first compensator with a first gain, a second compensator with a second gain higher than the first gain, and an actuator for moving the optical pickup head in either the following mode or the seeking mode. The method comprises steps of disabling the first compensator and enabling the second compensator, and determining an initial kick force of the actuator for moving the optical pickup head at the moment that the seeking mode is entered according to an operating factor of the first compensator before the first compensator is disabled.

In an embodiment, the initial kick force is determined in response to an initial output values of a lag compensator of the second lead-lag compensator, and the initial output value correlates to last input and output values of a lag compensator of the first lead-lag compensator realized immediately before the lag compensator of the first lead-lag compensator is disabled.

According to another aspect of the present invention, there is provided a method for determining an initial kick force for moving an optical pickup head upon the optical pickup head is switched from a following mode to a seeking mode. The method includes steps of disabling a first compensation operation applied to the following mode and enabling a second compensation operation applied to the seeking mode, determining on output value of the second compensation operation according to an output value of the first compensation operation, and determining the initial kick force in response to the output value of the second compensation operation.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
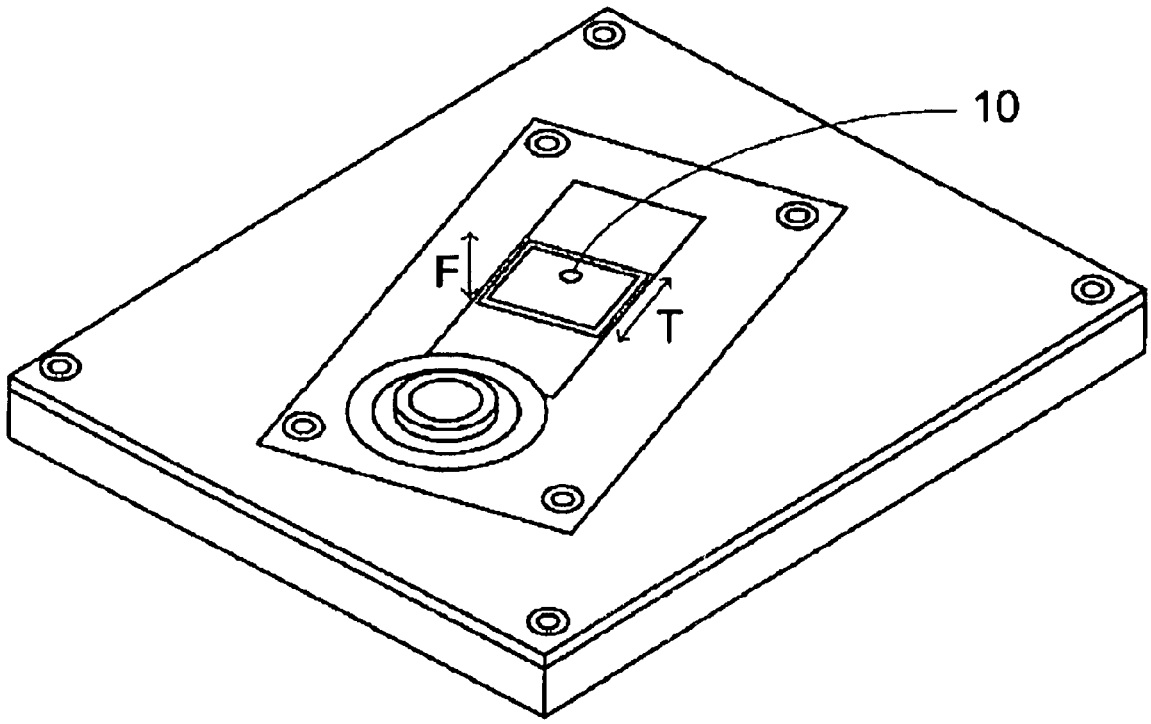
Fig.1 PRIOR ART
FIG. 1 schematically illustrates a typical optical pickup head.
Figure 2:
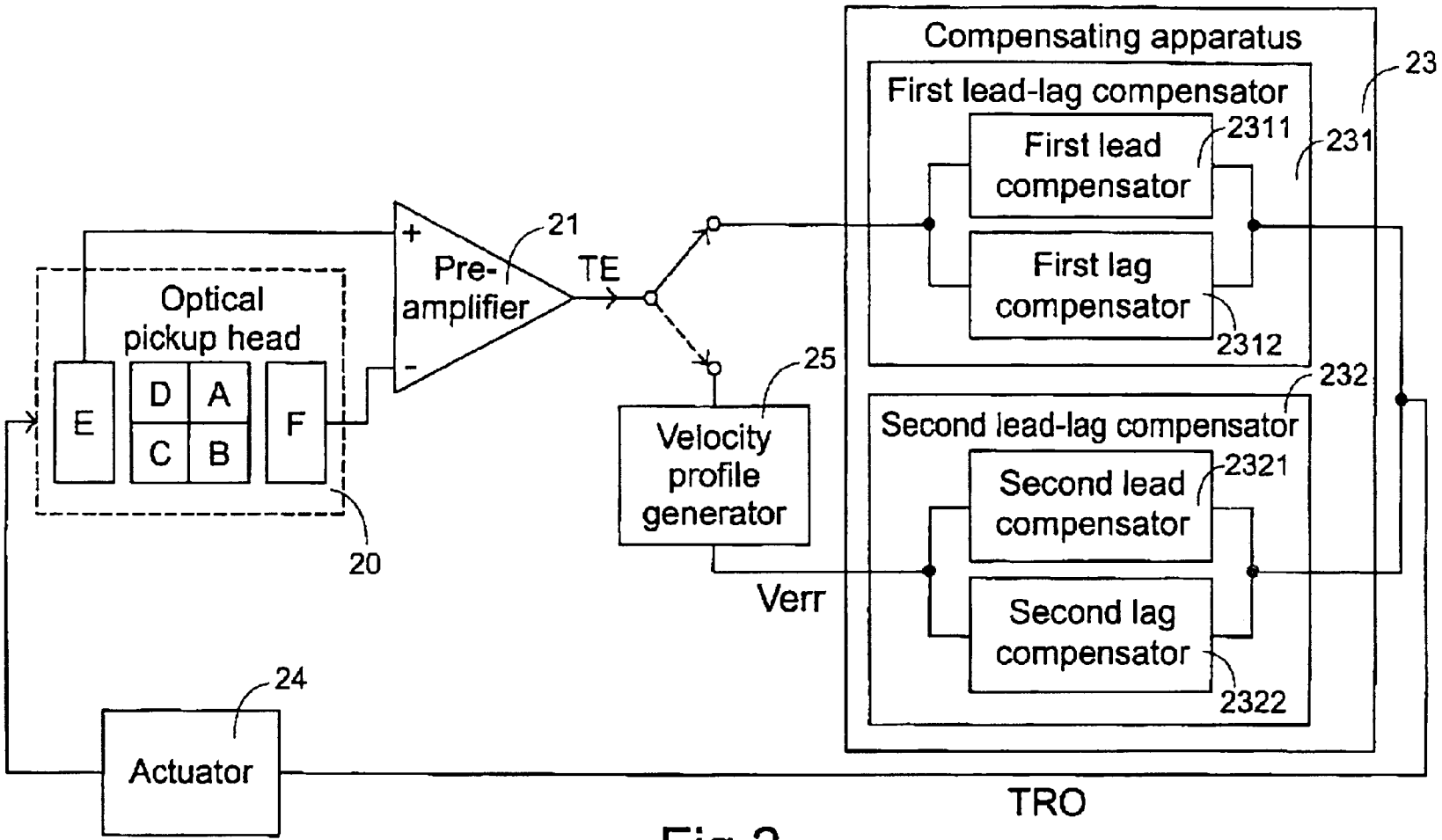
Fig.2 PRIOR ART
FIG. 2 is a functional block diagram illustrating a typical tracking control system for on optical pickup head.
Figure 3A:
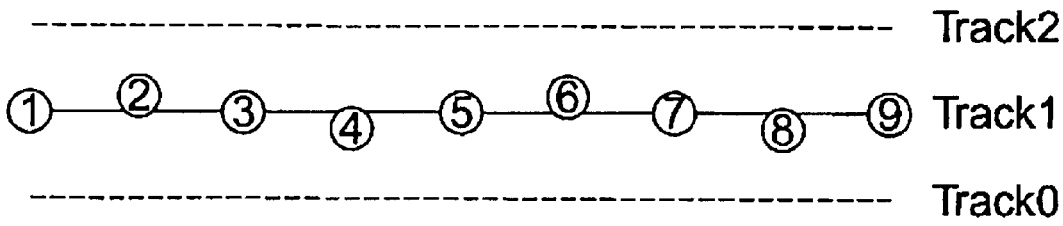
Fig.3(a) PRIOR ART
FIG. 3(a) schematically illustrates some positions of the optical pickup head occurring relative to track 1 of an optical disk in a following mode.
Figure 3B:
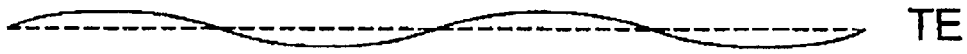
Fig.3(b) PRIOR ART
FIG. 3(b) is a schematic waveform diagram illustrating a tracking error signal TE in a following mode.
Figure 3C:
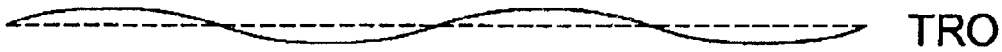
Fig.3(c) PRIOR ART
FIG. 3(c) is a schematically waveform diagram illustrating a tracking output signal TRO in a following mode.

In order to overcome the problems in the prior art, a method for controlling an optical pickup head is developed. The method is now illustrated based on a tracking control system of FIG. 2. The first lead-lag compensator 231 with a relatively low gain is selected for determining the kick force of the actuator 24 when the optical pickup head 20 is in a following mode. In contrast, the second lead-lag compensator 232 with a relative high gain is selected when the optical pickup head 20 is in a seeking mode.

Figure 4:
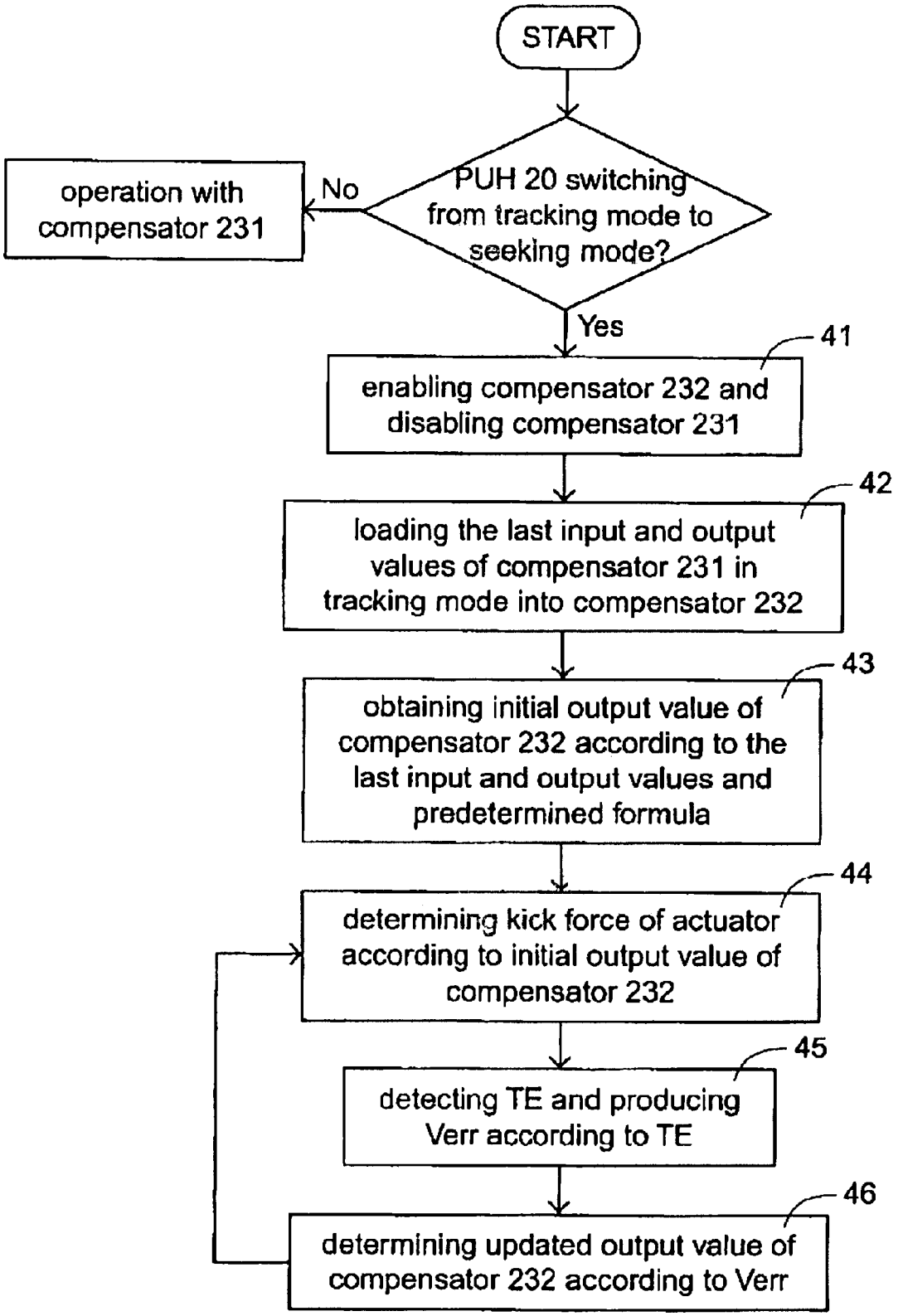
FIG. 4 is a flow chart of the method according to a preferred embodiment of the present invention.

The method for controlling the optical pickup head 20 of an optical processing apparatus, for example a compact disk-read only memory (CD-ROM) drive or a digital versatile disk-read only memory (DVD-ROM) drive, will be described as follows with reference to FIG. 4.

When the optical pickup head 20 switches from a following mode to a seeking mode, the first lead-lug compensator 231 is disabled and the second lead-lag compensator 232 is enabled, as indicated in Step 41. Meanwhile, the last input value and the last output value of the first lead-lag compensator 231 in the following mode is loaded into the second lead-lag compensator 232 to realize an initial output value according to a predetermined formula, as indicated in Steps 42 and 43. Then, in Step 44, an initial kick force of the actuator 24 in the seeking mode is determined according to the initial output value. The optical pickup head 20 is then moved by the actuator 24 under the initial kick force. Further, the motion-related information of the optical pickup head 20 in response to the kick force is provided to the pre-amplifier 21 so as to realize the tracking error signal TE. During the seeking mode, the velocity error signal Verr is produced by the velocity profile generator 25 according to the frequency variation level of the tracking error signal TE, as indicated in Step 45. The second lead-lag compensator 232 thus determines an updated output value according to the velocity error signal Verr and the predetermined formula, as indicated in Step 46. Therefore, an updated kick force of the actuator 24 is determined according to the updated output value, as indicated in Step 44. The kick force is being updated by keeping on monitoring the position of the optical pickup head relative to the optical disk.

In an embodiment, the output values of the first lag compensator 2312 and the second lag compensator 2322 are calculated by the following equations (1) and (2), respectively:

$$Y(m)=k1\times X(m)+k2\times X(m-1)+k3\times Y(m-1) \quad (1)$$

$$a(n)=k1\times b(n)+k2\times b(n-1)+k3\times a(n-1) \quad (2)$$

where

X(m) and Y(m) are input and output values of the first lag compensator 2312 in a following mode, respectively, a(n) and b(n) are input and output values of the second lag compensator 2322 in a seeking mode, respectively, and k1, k2 and k3 are coefficients.

It is assumed that the last input and the last output values of the first lag compensator 2312 obtained immediately before the following mode changes to the seeking mode are X(ntrack) and Y(ntrack), respectively, and the initial input and output values of the second lag compensator 2322 are a(nseek) and b(nseek), respectively. Thus, $$Y(ntrack)=k1\times X(ntrack)+k2\times X(ntrack-1)+k3\times Y(ntrack-1) \quad (3); \text{ and}$$

$$a(nseek)=k1\times b(nseek)+k2\times b(nseek-1)+k3\times a(nseek-1) \quad (4)$$

In accordance with the present invention, the last input and the last output values X(ntrack) and Y(ntrack) of the first lag compensator 2312 are incorporated into the equation (4) to substitute for the values b(nseek−1) and a(nseek−1), respectively, and the value b(nseek) is a preset value. Therefore, when the optical pickup head 20 is switched to the seeking mode, the output value a(nseek) of the second lag compensator 2322 is obtained by the following equation:

$$a(nseek)=k1\times b(nseek)+k2\times X(ntrack)+k3\times Y(ntrack) \quad (6)$$

Therefore, the second lead-lag compensator 232 incorporates therein the operational factors of the first lead-lag compensator 231.

According to the present invention, at the moment the following mode changes to the seeking mode, the power required for moving the optical pickup head from different positions around a starting track to the target track will be properly determined by referring to the operating factors of the previous compensator used in the following mode.

Since the last input and the last output values X(ntrack) and Y(ntrack) of the first lag compensator 2312 are utilized for determining the initial operating factors of the second lead-lag compensator 232, the initial kick force of the actuator 24 provided for the optical pickup head 20 at the beginning of a seeking mode can be precisely calculated according to the initial output value or the second lead-lag compensator 232. Such appropriate initial kick force is advantageous for performing an effective seeking operation, especially a short seeking operation.

The present invention is illustrated by referring to an optical pickup apparatus such as a compact disk-read only memory (CD-ROM) drive or a digital versatile disk-read only memory (DVD-ROM) drive. Nevertheless, the present invention can be applied to an optical recording apparatus, for example, a compact disk-recordable (CD-R) drive, a compact disk-rewritable (CD-RW) drive, a digital versatile disk-recordable (DVD-R) drive, a digital versatile disk-rewritable (DVD-RW) drive and a digital versatile disk-random access memory (DVD-RAM) drive.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling an optical pickup head of an optical processing apparatus, said optical pickup head being actuated by an actuator of said optical processing apparatus in either following mode or a seeking mode, said method comprising steps of:

disabling a first compensator of said optical processing apparatus with a first gain and enabling a second compensator of said optical processing apparatus with a second gain higher than said first gain when said optical pickup head switches from said following mode to said seeking mode;

determining an initial operating factor of said second compensator according to a last input value and a last output value of said first compensator, which are realized immediately before said first compensator is disabled in order to calculate an initial kick force of said actuator in said seeking mode; and actuating said optical pickup head to perform a seeking operation with said initial kick force.

2. The method according to claim 1 wherein said initial kick force is used for actuating said optical pickup head before a velocity feedback control of said optical pickup head is entered.

3. The method according to claim 2 wherein said initial operating factor of said second compensator is replaced by an updated operating value realized in response to a velocity error signal to adjust a kick force of said actuator under said velocity feedback control of said optical pickup head.

4. The method according to claim 1 wherein said first compensator and said second compensator are lead-lag compensators.

5. The method according to claim 4 wherein said initial operating factor of said second compensator is an output value a(nseek) of a lag compensator of said second lead-lag compensator, and $$a(nseek)=k1\times b(nseek)+k2\times X(ntrack)+k3\times Y(ntrack)$$

where b(nseek) is an input value of said lag compensator of said second lead-lag compensator, X(ntrack) and Y(ntrack) are said last input and said last output values of a lag compensator of said first lead-lag compensator, respectively, and k1, k2 and k3 are coefficients.

6. The method according to claim 1 wherein said optical processing apparatus includes an optical pickup apparatus selected from one of a compact disk-read only memory (CD-ROM) drive or a digital versatile disk-read only memory (DVD-ROM) drive.

7. The method according to claim 1 wherein said optical processing apparatus includes an optical recording apparatus selected from one of a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

8. A method for controlling an optical pickup head of on optical processing apparatus upon switching from a following mode to a seeking mode, said optical processing apparatus further comprising a first compensator with a first gain, a second compensator with a second gain higher than said first gain, and an actuator for moving said optical pickup head in either said following mode or said seeking mode, and said method comprising steps of:

disabling said first compensator, and enabling said second compensator; and determining an initial kick force of said actuator for moving said optical pickup head at the moment that said seeking mode is entered according to an initial output value of a lag compensator of said second compensator, which correlates to last input and output values of a lag compensator of said first compensator before said lag compensator of said first compensator is disabled.

9. The method according to claim 8 wherein said first compensator and said second compensator are lead-lag compensators.

10. The method according to claim 9 wherein said initial output value a(nseek) of said lag compensator of said second lead-lag compensator is calculated by the following equation:

$$a(nseek)=k1\times b(nseek)+k2\times X(ntrack)+k3\times Y(ntrack)$$

where

X(ntrack) and Y(ntrack) are said last input and said last output values of said lag compensator of said first compensator realized immediately before said lag compensator of said first compensator is disabled, respectively, b(nseek) is an initial input value of said lag compensator of said second lead-lag compensator, and k1, k2 and k3 are coefficients.

11. The method according to claim 8 wherein said optical processing apparatus includes an optical pickup apparatus selected from one of a compact disk-read only memory (CD-ROM) drive or a digital versatile disk-read only memory (DVD-ROM) drive.

12. The method according to claim 8 wherein said optical processing apparatus includes an optical recording apparatus selected from one of a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

13. A method for determining an initial kick force for moving an optical pickup head upon said optical pickup head is switched from a following mode to a seeking mode, said method comprising steps of:

disabling a first compensation operation applied to said following mode and enabling a second compensation operation applied to said seeking mode;

determining an output value of said second compensation operation according to an output value of said first compensation operation; and determining said initial kick force in response to said output value of said second compensation operation.

14. The method according to claim 13 wherein said first and said second compensation operations are performed by respective lead-lag compensators.

15. The method according to claim 14 wherein said first and said second compensation operations are performed by respective lag compensators of said lead-lag compensators.

*16. A method for controlling a pickup head of an optical processing apparatus, comprising:*

*disabling a first compensator of the optical processing apparatus and enabling a second compensator of the optical processing apparatus when the optical pickup head switches from a first operating mode to a second operating mode;*

*determining an initial operating factor of the second compensator based on an initial output value of a lag compensator of the second compensator; and*

*calculating an initial kick force to actuate the pickup head in the second operating mode, wherein the initial output value correlates to an output of a lag compensator of the first compensator.*

*17. The method according to claim 16, wherein a second gain value associated with the second compensator is greater than a first gain value associated with the first compensator.*

*18. The method according to claim 16, wherein the optical pickup head utilizes the initial kick force to perform a seeking operation of the optical processing apparatus.*

*19. A method for controlling an optical pickup head of an optical processing apparatus upon switching from a first operating mode to a second operating mode, the optical processing apparatus comprising a first compensator, a second compensator, and an actuator for moving the optical pickup head in either the first operating mode or the second operating mode, the method comprising:*

*disabling the first compensator and enabling the second compensator; and*

*determining an initial kick force of the actuator to operate the optical pickup head in the second operating mode, wherein the initial kick force corresponds to an initial output value of a lag compensator of the second compensator, and wherein the initial output value correlates to a final input value and a final output value of a lag compensator of the first compensator.*

*20. The method according to claim 19, wherein a second gain value associated with the second compensator is greater than a first gain value associated with the first compensator.*

*21. The method according to claim 19, wherein the first operating mode includes a following mode of the optical processing apparatus.*

*22. The method according to claim 19, wherein the second operating mode includes a seeking mode of the optical processing apparatus.*

*23. The method according to claim 19, wherein the optical pickup head utilizes the initial kick force to function according to the second operating mode of the optical processing apparatus.*

*24. An optical processing apparatus, comprising:*

*a pickup head configured to access information from an optical medium;*

*an actuator configured to operate the pickup head in a following mode or a seeking mode;*

*a first compensator configured to control the actuator when the pickup head operates in the following mode; and*

*a second compensator configured to control the actuator when the pickup head operates in the seeking mode, wherein when the pickup head switches from the following mode to the seeking mode, the optical processing apparatus provides the actuator an initial kick force corresponding to an initial output value of a lag compensator of the second compensator, and wherein the initial output value correlates to a final input value and a final output value of a lag compensator of the first compensator.*

* * * * *

UNITED STATES PATENT AND TRADEMARK OFFICE

CERTIFICATE OF CORRECTION

PATENT NO. : RE42,067 E
APPLICATION NO. : 12/357606
DATED : January 25, 2011
INVENTOR(S) : Lei et al.

It is certified that error appears in the above-identified patent and that said Letters Patent is hereby corrected as shown below:

Column 7, line 21, in Claim 8, after "head of" delete "on" and insert --an--.

Signed and Sealed this
Thirty-first Day of May, 2011

David J. Kappos
*Director of the United States Patent and Trademark Office*